(12) United States Patent
Scioscia, Jr.

(10) Patent No.: US 11,397,074 B2
(45) Date of Patent: Jul. 26, 2022

(54) ANTI-DOGLEG ELECTRONIC MEASUREMENT DEVICE

(71) Applicant: Klein Tools, Inc., Lincolnshire, IL (US)

(72) Inventor: Oreste Scioscia, Jr., Chicago, IL (US)

(73) Assignee: Klein Tools, Inc., Lincolnshire, IL (US)

( * ) Notice: Subject to any disclaimer, the term of this patent is extended or adjusted under 35 U.S.C. 154(b) by 200 days.

(21) Appl. No.: 16/553,916

(22) Filed: Aug. 28, 2019

(65) Prior Publication Data

US 2021/0063134 A1 Mar. 4, 2021

(51) Int. Cl.
*G01B 7/30* (2006.01)
*B29C 53/80* (2006.01)
*B21D 7/14* (2006.01)

(52) U.S. Cl.
CPC .............. *G01B 7/30* (2013.01); *B21D 7/14* (2013.01); *B29C 53/8041* (2013.01)

(58) Field of Classification Search
None
See application file for complete search history.

(56) References Cited

U.S. PATENT DOCUMENTS

| | | | | |
|---|---|---|---|---|
| 6,385,856 | B1 * | 5/2002 | Godin | B21D 7/063 33/343 |
| 6,532,675 | B2 * | 3/2003 | Letourneau | G01C 9/12 33/277 |
| 6,711,827 | B2 * | 3/2004 | Dougherty | G01C 9/14 33/370 |
| 6,874,240 | B1 * | 4/2005 | Cruttenden | G01C 9/12 33/391 |
| 6,980,880 | B1 * | 12/2005 | Ramsey | B21D 7/14 700/165 |
| 2007/0283587 | A1 * | 12/2007 | Cerwin | G01B 7/30 33/471 |
| 2017/0095849 | A1 * | 4/2017 | Nobles | B21D 7/02 |
| 2018/0164174 | A1 * | 6/2018 | Wiseman | G01L 13/00 |

* cited by examiner

*Primary Examiner* — Lisa M Caputo
*Assistant Examiner* — Nigel H Plumb

(57) ABSTRACT

A method and electronic measurement device are provided for putting multiple bends in a conduit while controlling the angular relationship of the bends relative to each other about the longitudinal axis of the conduit. The device includes an electronic component configured to generate a first signal that varies based on an angle of rotation of the component about an x-axis, and a housing carrying the electronic component and having a conduit mount structure configured to mount the housing on a conduit with the x-axis in parallel alignment with the longitudinal axis of the conduit.

17 Claims, 6 Drawing Sheets

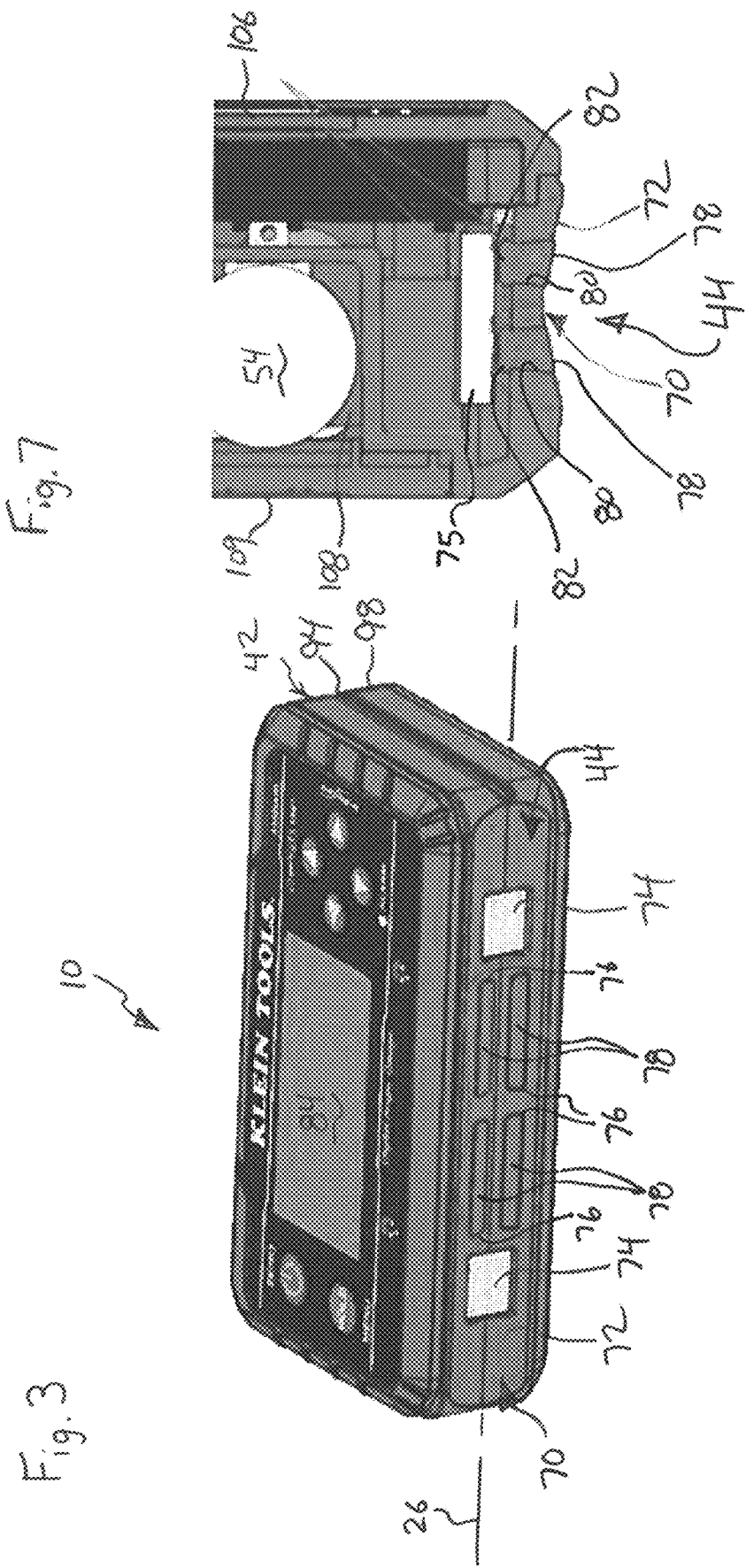

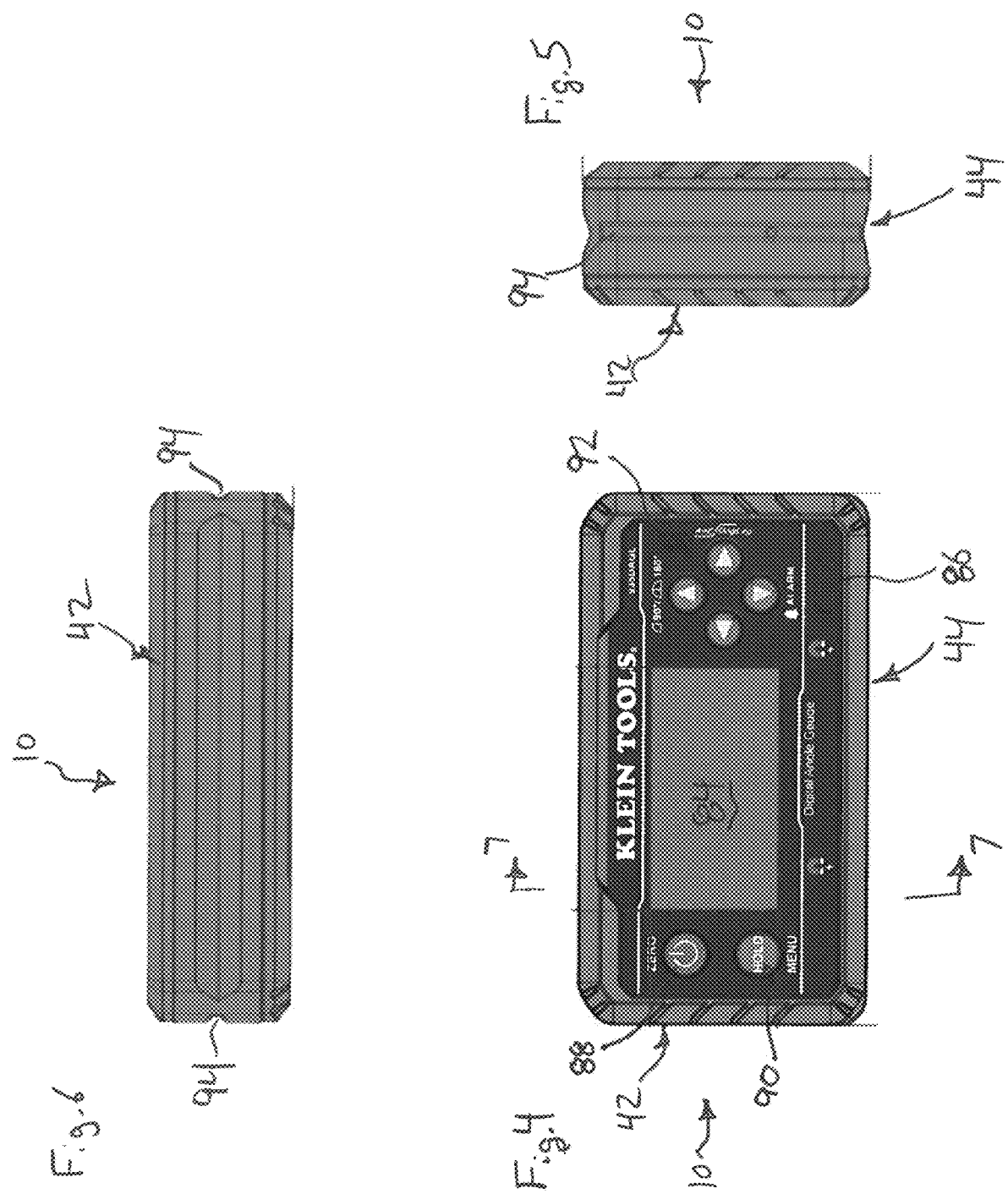

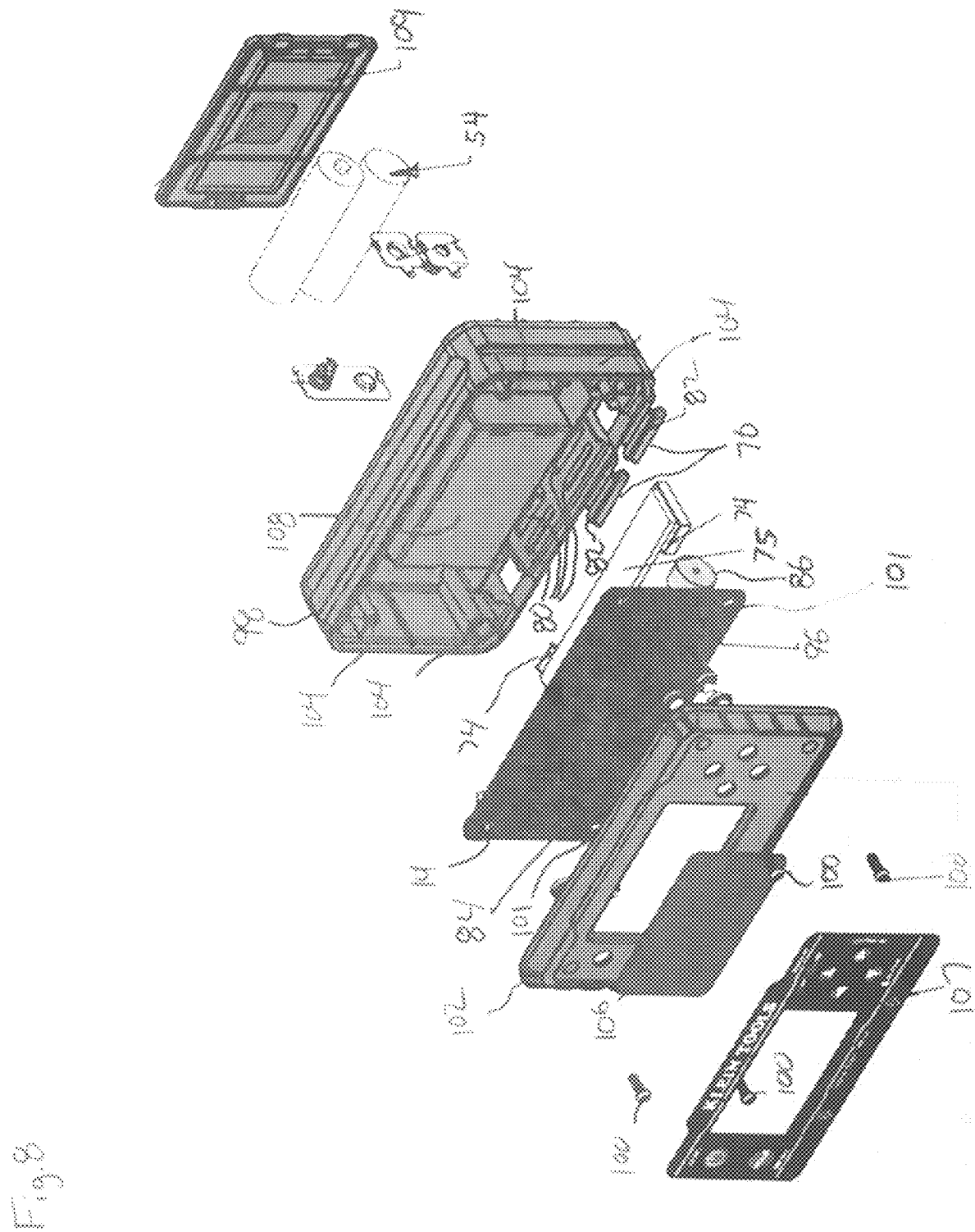

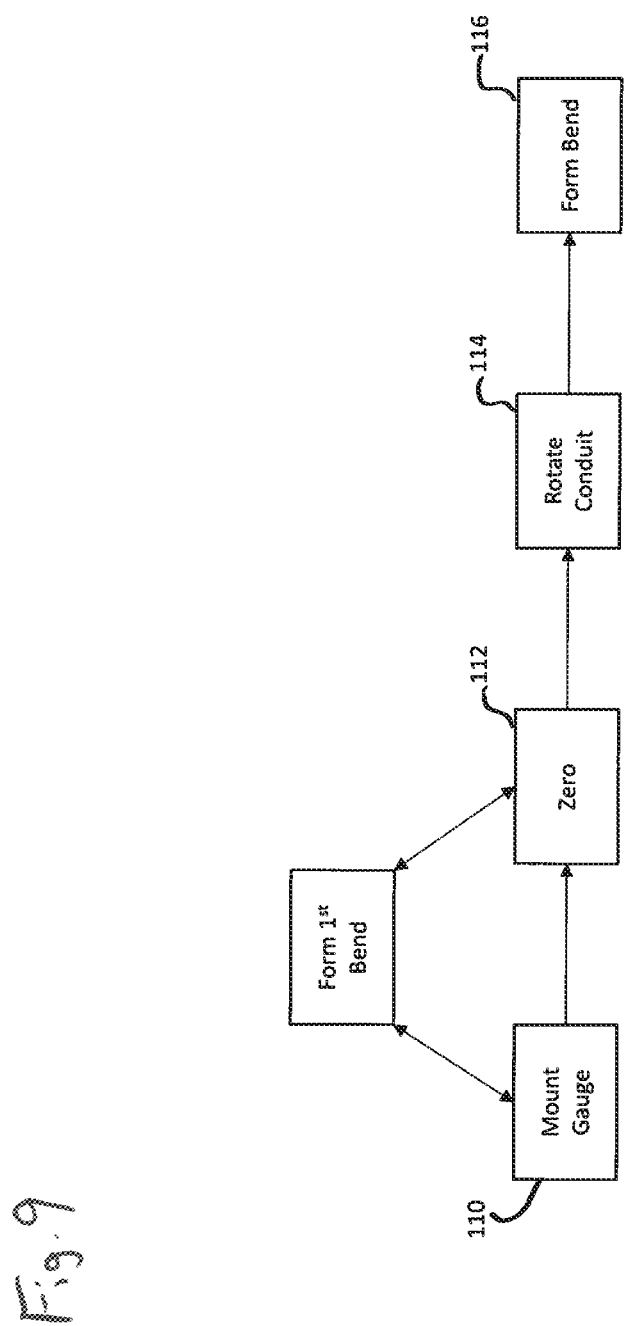

ANTI-DOGLEG ELECTRONIC MEASUREMENT DEVICE

CROSS-REFERENCE TO RELATED APPLICATIONS

None

BACKGROUND OF THE DISCLOSURE

The present disclosure relates to measurement devices that are used during the manual bending of conduit, and more particularly to electronic measurement devices that can be mounted on a conduit and provide an indication to a user of a change in an angular orientation of the conduit during the bending process in order to control the angular orientation of one bend relative to another bend about the longitudinal axis of a conduit, typically to prevent a so called "dogleg" in the conduit wherein a pair of adjacent bends do not lie in the same plane. Bubble levels in one form or another have been attached to a conduit to alert a user when a conduit has been rotated about its longitudinal axis approximately 180 degrees relative to gravity so that adjacent bends can be formed with a minimum of "dogleg", but such devices have limited accuracy and require a user to "read" the bubble in the level while forming the conduit bends.

BRIEF SUMMARY OF THE DISCLOSURE

In accordance with one feature of this disclosure, a method is provided for putting multiple bends lying in the same plane, i.e., no "dogleg", in an elongate conduit extending along a longitudinal axis. The method includes the steps of:

a) mounting an electronic measuring device to the conduit, the device capable of measuring an angle of rotation of the conduit about the longitudinal axis and providing an output alert to a user indicating when the angle of rotation equals 180 degrees;

b) forming a first bend in an elongate conduit;

c) zeroing the electronic measuring device to set the angle of rotation to zero;

d) after step c), rotating the conduit about the longitudinal axis until the electronic measuring device provides the user output alert indicating that the angle of rotation equals 180 degrees; and e) after step d), forming another bend in the conduit while the user output signal indicates that the angle of rotation equals 180 degrees.

In one feature, step a) is performed before step b).

According to one feature, step b) is performed before step a).

As one feature, step c) is performed before step b).

In one feature, step b) is performed before step c).

As one feature, the method further includes repeating steps d) through e) to form at least one additional bend.

According to one feature, the output alert includes a visual display showing the number 180.

In one feature, the output alert includes an audible alert.

In accordance with one feature of this disclosure, an electronic measuring device is capable of measuring an angle of rotation of a conduit about a longitudinal axis of the conduit. The device includes: an electronic component configured to generate a first signal that varies based on an angle of rotation of the component about an x-axis, the electronic component including at least one of an electronic gyroscope and an electronic accelerometer; a processing unit operably connected to the electronic component to receive the first signal therefrom and configured to generate a second signal representing the angle of rotation about the axis; a user output operably connected to the processing unit to receive the second signal therefrom and configured to produce an output alert to a user when the angle of rotation equals 180 degrees; a user input operably connected to the processing unit, the processing unit configured to zero the angle of rotation signal in response to a signal from the user input; and a housing carrying the electronic component, the processing unit, the user output and the user input, the housing having a conduit mount structure configured to mount the housing on a conduit with the x-axis in parallel alignment with the longitudinal axis of the conduit, the electronic component having a fixed positional relationship relative to the conduit mount structure.

As one feature, the user output includes at least one of a liquid crystal display, a light emitting diode, and a sound generating component.

According to one feature, the user input includes a user actuated button switch.

In one feature, the conduit mount structure includes a linear groove formed on an exterior of the housing and aligned with the x-axis. As a further feature, the conduit mount structure further includes at least one magnet located adjacent the groove to magnetically couple the housing to a conduit. In yet a further feature, the conduit mount structure further includes at least one anti-slip pad defining a surface in the groove to engage against a conduit aligned in the conduit mount structure. As a further feature, the at least one anti-slip pad is an elastomeric pad. In a further feature, the elastomeric pad is a silicon pad.

According to one feature, the housing further includes an alignment notch adjacent the conduit mount structure to allow a user to visually align the conduit mount structure with an alignment mark on a conduit.

As one feature, the at least one of an electronic gyroscope and an electronic accelerometer is a single electronic accelerometer.

In one feature, the at least one of an electronic gyroscope and an electronic accelerometer is a pair of electronic accelerometers According to one feature, the at least one of an electronic gyroscope and an electronic accelerometer is an electronic gyroscope.

In accordance with one feature of this disclosure, method is provided for putting multiple bends in an elongate conduit extending along a longitudinal axis. The method included the steps of:

a) mounting an electronic measuring device to the conduit, the device capable of measuring an angle of rotation of the conduit about the longitudinal axis and providing an output alert to a user indicating when the angle of rotation equals a first desired angle of rotation;

b) forming a first bend in an elongate conduit;

c) zeroing the electronic measuring device to set the angle of rotation to zero;

d) after step c), rotating the conduit about the longitudinal axis until the electronic measuring device provides the user output alert indicating that the angle of rotation equals the first desired angle of rotation; and e) after step d), forming a second bend in the conduit while the user output signal indicates that the angle of rotation equals the first desired angle of rotation.

As one feature, step a) is performed before step b).

According to one feature, step b) is performed before step a).

In one feature, step c) is performed before step b).

As one feature, wherein step b) is performed before step c).

According to one feature, the method further includes repeating steps d) through e) to form at least one additional bend.

In one feature, the method further includes:

f) after step e) zeroing the electronic measuring device to set the angle of rotation to zero;

g) after step f), rotating the conduit about the longitudinal axis until the electronic measuring device provides the user output signal indicating that the angle of rotation equals a second desired angle of rotation; and h) after step g), forming a third bend in the conduit while the user output alert indicates that the angle of rotation equals the second desired angle of rotation.

As one feature, at least one of the first and second desired angles of rotation equals 180 degrees.

According to one feature, the first and second bends are greater than 0 degrees and are less than 71 degrees.

It should be understood that the inventive concepts disclosed herein do not require each of the features discussed above, may include any combination of the features discussed, and may include features not specifically discussed above.

BRIEF SUMMARY OF THE SEVERAL VIEWS OF THE DRAWINGS

FIG. 3 is a perspective view from below and to the right of the electronic measuring device of FIG. 1;

FIG. 4 is a front elevation view of the electronic measuring device of FIG. 1;

FIG. 5 is a side elevation view of the electronic measuring device of FIG. 1;

FIG. 6 is a top view of the electronic measuring device of FIG. 1;

FIG. 7 is a partial section view taken along line 7-7 in FIG. 4;

FIG. 8 is an exploded view of the electronic measuring device of FIG. 1; and

FIG. 9 is a block diagram illustrating a method of forming bends in a conduit utilizing an electronic measuring device according to this disclosure.

DETAILED DESCRIPTION OF PREFERRED EMBODIMENTS

Figure 1:
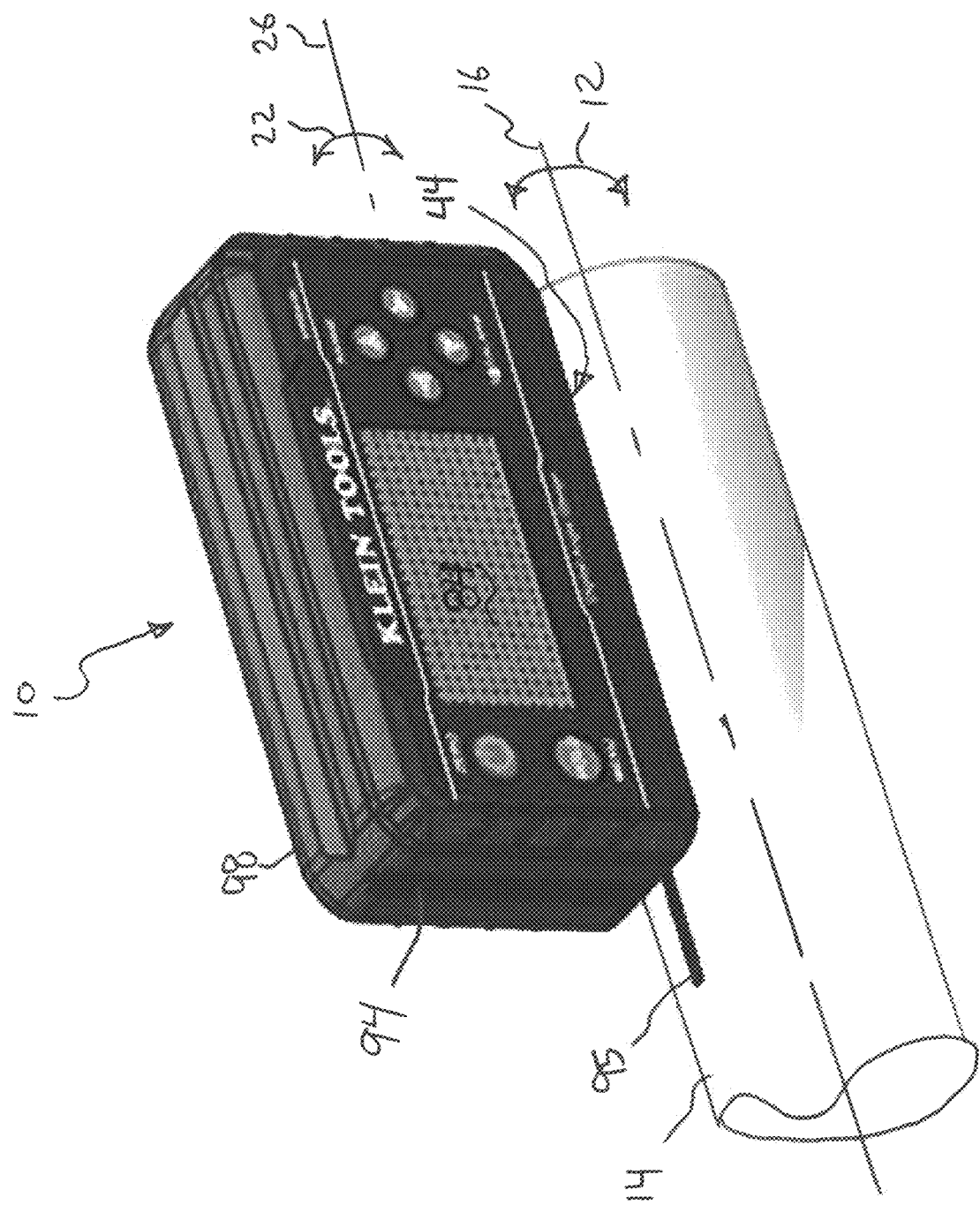
FIG. 1 is a perspective view from above and to the left of an electronic measuring device according to this disclosure mounted on a length of conduit.
Figure 2:
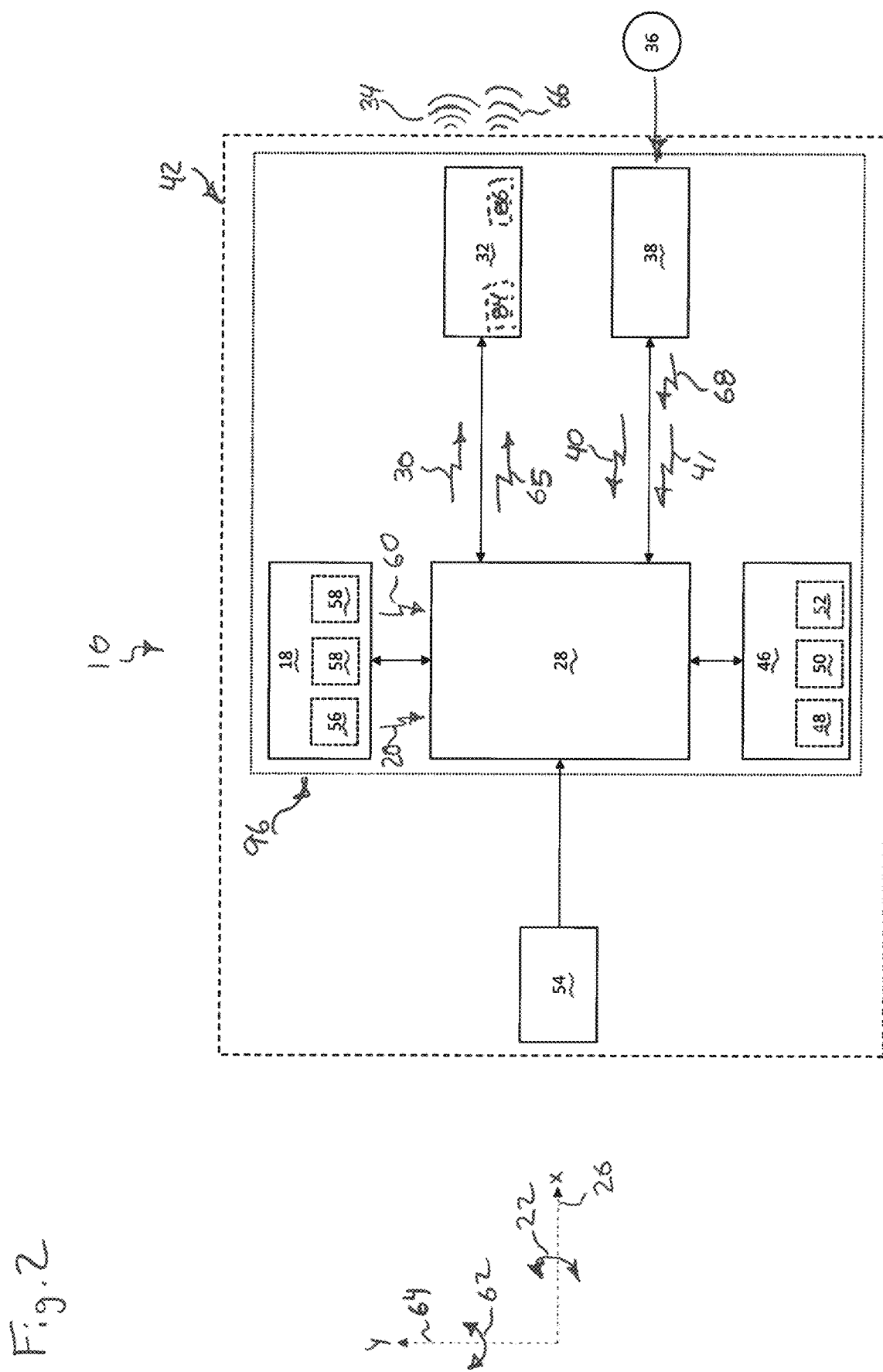
FIG. 2 is a diagrammatic representation of the electronic measuring device of FIG. 1.

As best seen in FIG. 1, an electronic measuring device in the form of a digital angle gauge 10 is provided to measure an angle of rotation 12 of a conduit 14 about a longitudinal axis 16 of the conduit 14, which allows a user to form multiple bends that lay in the same plane, i.e., without a so called "dogleg" in the conduit 14. As best seen in FIG. 2, the digital angle gauge 10 includes: an electronic component 18 configured to generate a signal 20 that varies based on an angle of rotation 22 of the electronic component 18 about an x-axis 26; a processing unit 28 operably connected to the electronic component 18 to receive the signal 20 therefrom and configured to generate a signal 30 representing the angle of rotation 22 about the x-axis 26; a user output 32 operably connected to the processing unit 28 to receive the signal 30 therefrom and configured to produce an output alert 34 to a user when the angle of rotation 22 equals a desired angle of rotation 36, typically 180 degrees; a user input 38 operably connected to the processing unit 28 to transmit a signal 40 that causes the processing unit 28 to zero the signal 30 to the user output 32 and a signal 41 that sets the desired angle of rotation 36; and a housing 42 carrying the electronic component 18, the processing unit 28, the user output 32, and the user input 38. As best seen in FIG. 3, the housing 42 has a conduit mount structure 44 configured to mount the housing 42 to the conduit 14 with the x-axis 26 in parallel alignment with the longitudinal axis 16 of the conduit 14. The electronic component 18 is mounted in the housing 42 with a fixed positional relationship relative to the conduit mount structure 44.

As shown in FIG. 2, the digital angle gauge 10 can also include a memory unit 46 operably connected to the processing unit 28 to be accessed by the processing unit 28. The memory unit 46 may include a database 48 and/or a cache 50. The database 48 can, for example, include conversion tables and other information as may be required depending upon the specifics of each application. The cache 50 may be used, for example, to temporarily store date representative of the angle of rotation 22 and/or a desired angle of rotation 36 selected or input by a user via the user input 38. The gauge 10 may also may also include program instructions or code 52 that are permanently or temporarily resident in the memory unit 46 and that are readable and executable by the processing unit 28 to perform one or more of the steps or functions of the gauge 10. The memory unit 46 can be provided in any suitable form, many of which are known, including any suitable volatile and non-volatile memory, such as for example, flash memory, ROM, PROM, EPROM, EEPROM, DRAM, and SRAM.

The gauge 10 may also include a power source 54, typically in the form of one or more suitable batteries 54, operably connected to the components 18, 28, 32, 38, and 46 to power the same, as shown in FIG. 2. In the illustrated embodiment, the batteries 54 are carried in the housing 42 and are replaceable, as is typical for similar electronic devices.

In the illustrated embodiments and as shown in FIG. 2, the electronic component 18 is provided in the form of at least one of a suitable electronic gyroscope 56 or a suitable electronic accelerometer 58. In one preferred embodiment, the electronic component 18 is a single electronic accelerometer 58. In another preferred embodiment, the electronic component 18 is a pair of accelerometers 58. In yet another preferred embodiment, the electronic component 18 is a single electronic gyroscope 56. Any or all of the accelerometers 58 mentioned above can be a single axis, a two axis, or a three axis accelerometer depending upon the requirements of any specific application, some of which may include functionality beyond the measurement of the angle of rotation about the x-axis 26. For example, in the illustrated embodiment, the electronic component 18 is also configured to generate a signal 60 that varies based on an angle of rotation 62 about a y-axis 64, the processing unit 28 is configured to selectively generate a signal 65 representing the angle of rotation 62 in response to the signal 60 from the electronic component 18, the user output 32 is configured to selectively produce an output alert 66 indicating the angle of rotation 62 in response to the signal 65, and the user input 38 is configured to send a signal 68 that commands the processing unit 28 to switch between sending the signal 30 and the signal 65 to the user output 32.

The processing unit 28 can be provided in any suitable form or combination, many of which are known. As used herein the term "processing unit" includes any form of computer processing unit, such as central processing units and microprocessors.

As best seen in FIGS. 3 and 7, the conduit mount structure 44 includes a linear groove 70 formed in an exterior of the housing 42 and extending parallel to the x-axis 26 to receive the conduit 14 with the x-axis 26 and the longitudinal axis 16 in parallel alignment. The groove 70 has a surface 72 shaped to at least partially conform to the exterior of the conduit 14, i.e. with a curved or v-shaped cross-sectional profile that at least partially conforms to the cylindrical shape of the conduit 14. In the illustrated and preferred embodiment, the conduit mount structure 44 further includes a pair of magnets 74 fixed in the housing 42, spaced along the x-axis 26, and recessed in the surface 72 to magnetically couple the housing 42 to the conduit 14. It is preferred that the magnets 74 provide a magnetic force of sufficient strength to maintain the position of the housing 42 on the conduit 14 during operation of the gauge 10 and the bending of the conduit 14. In this regard, as best seen in FIG. 8, in the preferred embodiment, a metal plate 75 is fixed in the housing 42 extending between the magnets 74 to improve the magnetically couple between the magnets 74 and the conduit 14. As best seen in FIG. 3, to further insure that the housing 42 is doesn't shift relative to the conduit 14 during operation, the conduit mount structure 44 of the preferred embodiment further includes four anti-slip pads 76 having surfaces 78 that engage against the conduit 14 when the conduit 14 is received in the groove 70. It is preferred that the pads 76 be made from a suitable elastomer, and highly preferred that they be made from a suitable silicon material. As best seen in FIG. 3, in the illustrated embodiment, each of the surfaces 78 have a rectangular profile that extends along the length of the groove 70, parallel to the x-axis 26. As best seen in FIG. 7, each of the pads 76 is received in a conforming slot 80 formed in the housing 42, with each pad having a shouldered top portion 82 that, in combination with a frictional fit between the pad 76 and the slot 80, retains that pad 76 in the slot 80.

In the illustrated embodiment and as best seen in FIG. 4, the user output 32 includes a visual display in the form of a liquid crystal or light emitting diode display 84, and a sound generating component in the form of a speaker or alarm 86. In the preferred embodiment, the display 84 will show the angle of rotation 22 in numerical degrees as the gauge 10 and conduit 14 are rotated about the axes 16 and 26, with the speaker/alarm 86 providing a tonal indication when the desired angle of rotation 36, typically 180 degrees, is achieved. The visual display of the actual angle of rotation 22 in degrees coupled with the tonal indication provides a user with a double alert 34 that the desired angle of rotation 36 has been achieved. In some embodiments, the display 84 may be a touchscreen display and provide all or part of the user input 38.

As best seen in FIG. 4, the user input 38 of the illustrated embodiment include a power on/off and zero button 88 that can provide signals to power on and power off the gauge 10 and to zero the angle of rotation 22; a menu/hold button 90 that can provide signals to control user menus shown on the display 84, to select items on the menu, and to retain an angle shown on the display 84, and four arrow buttons 92 that can provide signals that allow a user to manipulate the menus shown on the display 84 and highlight selections on the menus. In this regard, the arrows 92 can allow a user to select the desired angle of rotation 36, typically 180 degrees, from a menu of possible angles of rotation, or to input a specific desired angle of rotation by "arrowing" up or down to increase or decrease a numerical display of the desired angle of rotation 36.

As best seen in FIGS. 1, 5, and 6, in the illustrated and preferred embodiment, the housing 42 includes an a pair of alignment notches 94 located on opposite ends of the housing 42, with each notch 94 being centered on the groove 70 and extending perpendicular to the x-axis 26 and parallel to the y-axis 64 down to closely adjacent the groove 70. Each notch 94 allows a user to align visually align and/or confirm alignment of the housing 42 and the mount structure 44 with an alignment mark 95 on the conduit 14, thereby locating the rotational position of the gauge 10 with respect to the longitudinal axis 16 of the conduit 14.

In the illustrated embodiment, the electronic component 18, the processing unit 28, the user output 32, the user input 38, and the memory unit 46 are all fixed on a printed circuit board 96, with traces on the board 96 operably connecting, i.e., electrically connecting, all of the components 18, 28, 32, 38, and 46.

The housing 42 of the illustrated embodiment includes a main housing part 98 that includes the mount structure 44 and mounts the circuit board 96 and electronic component 18 in fixed positional relationship to the mount structure 44. In this regard, as best seen in FIG. 8, a plurality of threaded fasteners 100 extend through corresponding holes 101 in the circuit board 96 and in a housing cover 102 to engage threaded bosses 104 formed in the housing part 98 to fix the circuit board 96 and the cover 102 to the main housing part 98. The cover 102 includes a lens 106 to protect the display 84 and a printed overlay 107 to protect and identify the switches of the user input 38. The main housing part 98 includes a battery compartment 108 that is closed by a cover 109.

To form two bends with a desired angular relationship between the bends, a the user will mount the gauge 10 to a conduit 14, either before or after forming a first bend, as shown at 110; zero the angle of rotation 22 via the user input 38, again either before or after forming a first bend, as shown at 112; after step 112, the user will rotate the conduit 14 about the axis 16 until the gauge 10 provides an output alert 34 indicating that the angle of rotation 22 equals a desired angle of rotation 36, typically 180 degrees, as shown at 114; and after step 114, the user will form a second bend in the conduit while the gauge 10 continues to indicate that the angle of rotation 22 equals the desired angle of rotation 36, as shown at 116. It should be understood that steps 110 and 112 can be performed either before or after forming the first bend, but that step 112 can only be performed after step 110. It should further be understood that the location of the gauge 10 relative to the conduit 14 cannot be altered after step 112 and during steps 114 and 116. Steps 114 and 116 can be repeated to form one or more additional bends in the conduit 14 at any desired angle of rotation 36. In this regard, step 112 can also optionally be repeated for additional bends. Often, it will be desired to form two or more bends in a conduit without any "dogleg", in which case the user can set the desired angle of rotation 36 to 180 degrees via the user input 38. Alternatively, for a conduit that requires a "dogleg", the user can set the desired angle of rotation 36 to provide whatever angular relationship is required between adjoining bends in a conduit. Typically the bends formed in the conduit will be greater than zero degrees and less than 71 degrees, but any bend angle can be used with the features and methods described herein. Typically, a user will employ a manual conduit bender, many of which are known, to form the bends in the conduit.

Preferred embodiments of the inventive concepts are described herein, including the best mode known to the inventor(s) for carrying out the inventive concepts. Variations of those preferred embodiments will become apparent to those of ordinary skill in the art upon reading the foregoing description. The inventor(s) expect skilled artisans to employ such variations as appropriate, and the inventor(s) intend that the inventive concepts can be practiced otherwise than as specifically described herein. Accordingly, the inventive concepts disclosed herein include all modifications and equivalents of the subject matter recited in the claims appended hereto as permitted by applicable law. Moreover, any combination of the above-described elements and features in all possible variations thereof is encompassed by the inventive concepts unless otherwise indicated herein or otherwise clearly contradicted by context. Further in this regard, while highly preferred forms of the Electronic Measurement Device 10 are shown in the figures, it should be understood that this disclosure anticipates variations in the specific details of each of the disclosed components and features of Electronic Measurement Device 10 and that no limitation to a specific form, configuration, or detail is intended unless expressly and specifically recited in an appended claim.

For example, while specific and preferred forms have been shown for the electronic component 18, other combinations of gyroscopes 56 and accelerometers 58 may be desirable in some applications. As another example, while specific and preferred forms have been shown for the user output 32, other types or additional types of user outputs may be desirable. For example, in some applications it may be desirable for the user output 32 to include a single light source or a combination of single light sources, such as LED's, that either illuminate or change colors to provide the output alert 34. As yet another example, while specific and preferred forms have been shown for the user input 38, other types or additional types of user inputs may be desirable. For example, in some applications it may be desirable for the user input 38 to include a microphone and for the processing unit 28 to be configured for voice recognition. As a further example, while the preferred and specific forms have been shown for the housing 42, other forms may be desirable depending upon the requirements of each application. For example, in some applications it may be desirable for the housing 42 to have a different form factor than that disclosed herein, for the housing 42 to have an entirely different shape than that disclosed herein, for the housing 42 to be made of more or fewer components, and/or for the housing 42 to provide different means for mounting, retaining and fixing the components of the device 10. As an even further example, while a highly preferred configuration has been shown for the mount structure 44, in some applications it a different configuration may be desired. For example, in some applications it may be desirable to use a single magnet 74 or more than two magnets 74 or for a mechanical clamp or fastener to be substituted for the magnets 74, or for there to be no anti-slip pads 76 or more or less than four anti-slip pads 76, or for the groove 70 to be discontinuous, etc. As an even further example, while preferred forms of the anti-slip pads 76 have been shown herein, in some applications it may be desirable for the pads 76 to be provided in a different shape and/or for the pads 76 to be mounted/retained to the housing in a different manner or with a different structure, such as for example, by bonding the pads 76 to the housing or using a bracket or fastener to retain/engage the pads 76 with the housing.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. The use of any and all examples, or exemplary language (e.g., "such as") provided herein, is intended merely to better illuminate the inventive concepts disclosed herein and does not pose a limitation on the scope of any invention unless expressly claimed. No language in the specification should be construed as indicating any non-claimed element as essential to the practice of the inventive concepts disclosed herein.

All references, including publications, patent applications, and patents, cited herein are hereby incorporated by reference to the same extent as if each reference were individually and specifically indicated to be incorporated by reference and were set forth in its entirety herein.

What is claimed is:

1. A method for putting multiple bends lying in the same plane in an elongate conduit extending along a longitudinal axis, the method comprising the steps of:
    a) mounting an electronic measuring device to the conduit, the device capable of measuring an angle of rotation of the conduit about the longitudinal axis and providing an output alert to a user indicating when the angle of rotation equals 180 degrees;
    b) forming a first bend in an elongate conduit;
    c) zeroing the electronic measuring device to set the angle of rotation to zero;
    d) after step c), rotating the conduit about the longitudinal axis until the electronic measuring device provides the user output alert indicating that the angle of rotation equals 180 degrees; and
    e) after step d), forming another bend in the conduit while the user output signal indicates that the angle of rotation equals 180 degrees.

2. The method of claim 1 wherein step a) is performed before step b).

3. The method of claim 1 wherein step b) is performed before step a).

4. The method of claim 1 wherein step c) is performed before step b).

5. The method of claim 1 wherein step b) is performed before step c).

6. The method of claim 1 further comprising repeating steps d) through e) to form at least one additional bend.

7. The method of claim 1 wherein the output alert comprises a visual display showing the number 180.

8. The method of claim 1 wherein the output alert comprises an audible alert.

9. A method for putting multiple bends in an elongate conduit extending along a longitudinal axis, the method comprising the steps of:
    a) mounting an electronic measuring device to the conduit, the device capable of measuring an angle of rotation of the conduit about the longitudinal axis and providing an output alert to a user indicating when the angle of rotation equals a first desired angle of rotation;

b) forming a first bend in an elongate conduit;

c) zeroing the electronic measuring device to set the angle of rotation to zero;

d) after step c), rotating the conduit about the longitudinal axis until the electronic measuring device provides the user output alert indicating that the angle of rotation equals the first desired angle of rotation; and e) after step d), forming a second bend in the conduit while the user output signal indicates that the angle of rotation equals the first desired angle of rotation.

10. The method of claim 9 wherein step a) is performed before step b).

11. The method of claim 9 wherein step b) is performed before step a).

12. The method of claim 9 wherein step c) is performed before step b).

13. The method of claim 9 wherein step b) is performed before step c).

14. The method of claim 9 further comprising repeating steps d) through e) to form at least one additional bend.

15. The method of claim 9 further comprising:

f) after step e) zeroing the electronic measuring device to set the angle of rotation to zero;

g) after step f), rotating the conduit about the longitudinal axis until the electronic measuring device provides the user output signal indicating that the angle of rotation equals a second desired angle of rotation; and h) after step g), forming a third bend in the conduit while the user output alert indicates that the angle of rotation equals the second desired angle of rotation.

16. The method of claim 15 wherein at least one of the first and second desired angles of rotation equals 180 degrees.

17. The method of claim 15 wherein the first and second bends are greater than 0 degrees and are less than 71 degrees.

* * * * *